July 11, 1967 J. R. ROBERTSON 3,330,600
SEAT CUSHIONS
Filed June 2, 1966 2 Sheets-Sheet 1
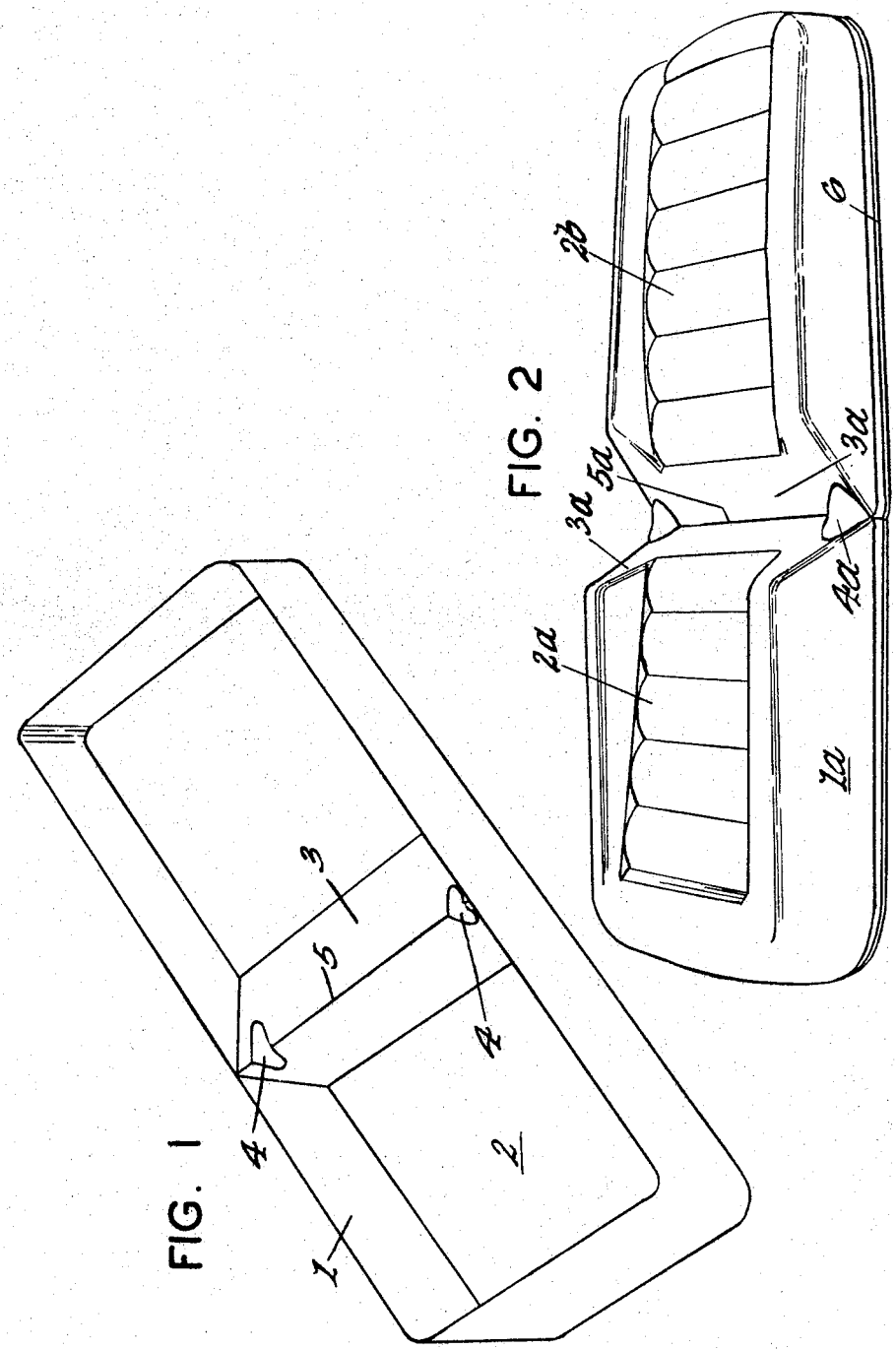
INVENTOR
JOHN R. ROBERTSON
BY
*James R. Hulan*
ATTORNEY July 11, 1967 J. R. ROBERTSON 3,330,600
SEAT CUSHIONS Filed June 2, 1966 2 Sheets-Sheet 2

INVENTOR
JOHN R. ROBERTSON
BY James R. Hulen
ATTORNEY 3,330,600
SEAT CUSHIONS
John R. Robertson, Currie, Scotland, assignor to The North British Rubber Company Limited, Edinburgh, Scotland, a corporation of Scotland
Filed June 2, 1966, Ser. No. 554,860
5 Claims. (Cl. 297—454)

This invention relates to the molding of plastics material in the production of seat bodies, particularly in the production of seats suitable for use in vehicles, although the production of seats for domestic purposes is not precluded.

Broadly, the invention consists in a method of making a seat body which comprises forming an integral pair of dished cover portions from flexible plastics material, the cover portions being joined along a respective edge by a narrow portion of the plastics material serving as a hinge while the opposed sides of the cover portions are at an angle to one another, and subsequently providing a filling of cellular plastics material in each cover portion. In use, because of the angle between the opposed sides of the dished cover portions, said portions may be displaced from their originally flat position to an angled position whereby one portion will serve as a seat or squab and the other will serve as a back rest in an assembled seat.

Various methods may be adopted for making the cover portions. Slush molding and similar rotational casting techniques may be adopted, for example, and in this case it would be convenient to cast a pair of the covers in one operation, these then being separated from one another by cutting along a median line. Another possible method is to spray a correspondingly shaped mold surface with a plastics material; in this case if desired, a fibrous filler/reinforcing agent could be sprayed concurrently. Much the most suitable method, however, is vacuum-forming. In this case, the dished cover portions are vacuum-formed onto a correspondingly shaped mold surface from flexible vacuum-forming sheet stock. In a preferred method of operation, the vacuum-formed cover portions are held under vacuum in the mold at a suitable temperature while they are charged with polyurethane foam reactants and the vacuum is maintained at least while the temperature (which will generally rise as a result of the exothermic reaction) is above the distortion temperature of the vacuum-formed cover stock. The vacuum-forming mold in this case may be provided with a cover whereby the mold may be closed during the expansion of the cellular plastics material.

The angle between the two opposed sides of the dished cover portions is preferably such that when the portions are folded to bring these sides into abutment with one another the angle between the seat surface of the squab and the forward surface of the back is between about 95–115°.

The dished cover portions may be filled to leave a marginal region thereof projecting for securing to a frame or back board of the complete chair.

The vacuum-forming mold will of course normally incorporate patterning to produce a desired pattern on the support surfaces of the eventual chair and these may include upstanding portions at the sides.

Where the angled opposed sides of the vacuum-forming mold meet to define the hinge portion, one or more channels may be cut across this line to define, in the eventual vacuum-formed molding, a web connecting the two dished portions together thus limiting the hinging action and preventing the resulting seat body from unfolding to a degree beyond the flat position. This channel will normally be kept clear of the cellular plastics filling so that folding of the two seat portions together is not hindered. The channel or channels across the hinge, in addition to prevent unfolding, may also be made specifically to accommodate rigid members of a chair framework.

The invention will be described further with reference to the accompanying drawings, of which:

FIGURE 1 is a diagrammatic perspective view of a vacuum-forming mold,

FIGURE 2 is a perspective view of a cushion in the open position, the cover of which was vacuum-formed in a mold generally as shown in FIGURE 1 but having the appropriate patterning.

Figure 3:
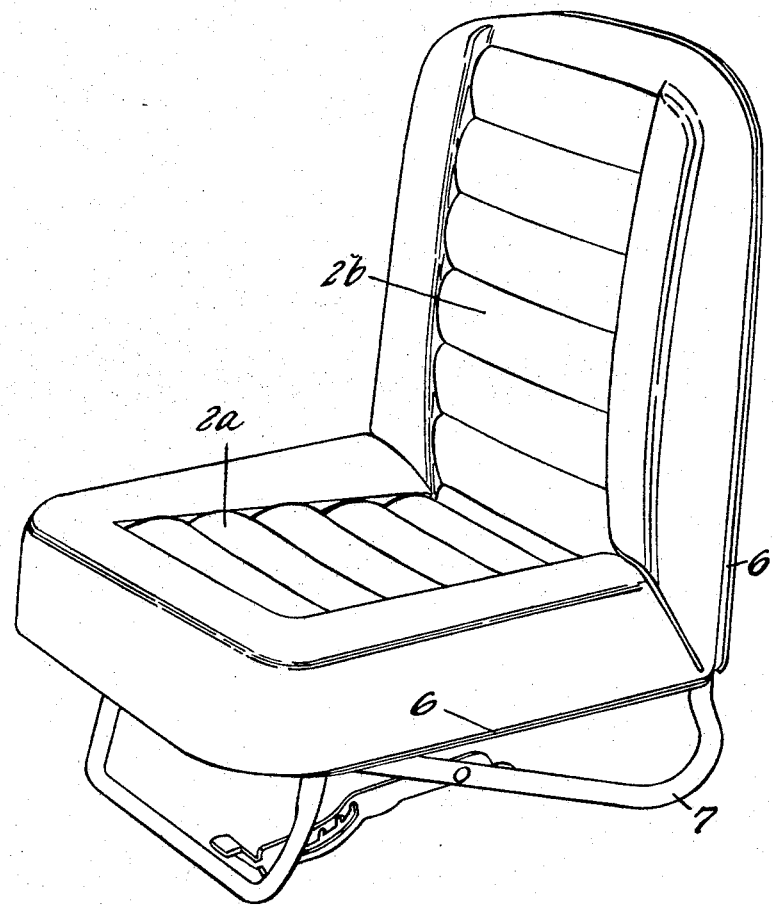
FIGURE 3 is a perspective view of a car seat made by fitting a cushion as shown in FIGURE 2, to a car seat frame.

The mold illustrated in FIGURE 1 is broadly in the form of an open box having side walls 1, a base 2, divided at an intermediate position by an inverted V-shaped partition 3, the apex 5 of which reaches substantially to the top edge of the side walls 1. Two spaced channels 4 are arranged across the apex of the partition 3.

In a practical arrangement, the two portions of the mold separated by the partition 3 will have surface configurations corresponding to the shaping and ornament desired in the corresponding squab and back rest.

FIGURE 2 illustrates the molding from a typical mold based on the general arrangement shown in FIGURE 1. The side walls 1 of the mold correspond to the side walls 1a of the cushion cover; the apex 5 of the partition corresponds to the hinge portion 5a across the middle of the cushion cover; the opposed side faces of the two cushion cover portions 3a which are at an angle to one another correspond to the partition 3, while the broad face of the squab portion 2a and of the back rest portion 2b correspond to the base 2 of the mold.

In making a vacuum-formed molding as illustrated in FIGURE 2, normal vacuum-forming practice using thermoplastic sheet will be adopted. The sheet will generally be pre-heated to 300° F.–380° F. depending upon its composition and properties, while the mold temperature may be in the range 30° C. to 50° C.

In making a cushion, the vacuum-formed cover has to be filled and this is conveniently done by using a two component polyurethane foam system. This technique is in itself well known and need not be described in detail here. The two components are mixed and poured into the mold which may at this stage be at about 40° C., and then the mold heated for a suitable time and at a suitable temperature which may for example be for 10–20 minutes at 100–150° C. At this high temperature the vacuum may be maintained on the molding to constrain it to keep its shape. Alternatively, flexible polyurethane foam chips may be used together with a suitable adhesive which may be a polyurethane prepolymer subsequently activated by an aqueous activating agent. In the molding operation, using either technique, the mold will normally be closed so that the cushion cover is filled under slight pressure.

The foam filled cushions may then be built up into a seat by using techniques common in the upholstery trade, although since the cover is generally of thermoplastic sheet, heat sealing and welding may be adopted.

As illustrated in FIGURE 2, the cover sides 1a are secured to a wooden backing (not seen) through the medium of pins which are concealed by a conventional "concealed fastening" type of bead 6. The open angle between the faces 3a then permits the seat to be folded to assume the position shown in FIGURE 3 in which the wooden backings are secured to a steel frame 7. The webs 4a connecting the seat squab and back rest prevent the assembly from unfolding too much and may also accommodate a portion of the frame 7 where it extends from below the squab to the rear of the seat back.

Although polyurethane foam has been described herein as the preferred example of a "cellular plastics material," other foam materials, such as latex foam, are usable herewith as the filling material.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true scope and spirit of the invention.

Having thus described my invention, what I claim and desire to protect by Letters Patent is:

1. A seat assembly comprising: a pair of contoured cover portions of flexible plastic material, said portions having broad faces for forming the seat and back rest for said assembly and opposed sides having a common edge forming a hinge for said portions, said opposed sides being at an angle when said faces are disposed substantially parallel to one another; and a filling of cellular plastics material in said cover portions.

2. The seat assembly of claim 1 wherein an angle of 95° to 115° is formed between said faces when said opposed sides are brought into abutment with one another.

3. The seat assembly of claim 1 further comprising at least one web interconnecting said portions to prevent said assembly from unfolding beyond a predetermined limit.

4. The seat assembly of claim 1 wherein said filling is latex foam.

5. The seat assembly of claim 1 wherein said filling is polyurethane foam.

References Cited

UNITED STATES PATENTS

| | | | |
|---|---|---|---|
| 2,990,007 | 6/1961 | Kessler | 297—457 X |
| 3,007,737 | 11/1961 | Lichter | 297—378 |
| 3,024,068 | 3/1962 | Eames | 297—455 |
| 3,226,157 | 12/1965 | Reinfeldt et al. | 297—378 X |
| 3,233,885 | 2/1966 | Probst | 267—1 |
| 3,264,034 | 8/1966 | Lawson | 297—456 |

FOREIGN PATENTS 1,380,470   10/1964   France.

CASMIR A. NUNBERG, *Primary Examiner.*